US011453394B2

(12) United States Patent
Ohmura et al.

(10) Patent No.: US 11,453,394 B2
(45) Date of Patent: Sep. 27, 2022

(54) VEHICLE CONTROL DEVICE AND VEHICLE CONTROL METHOD

(71) Applicant: MAZDA MOTOR CORPORATION, Hiroshima (JP)

(72) Inventors: Hiroshi Ohmura, Hiroshima (JP); Rie Awane, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 594 days.

(21) Appl. No.: 16/444,821

(22) Filed: Jun. 18, 2019

(65) Prior Publication Data

US 2020/0039512 A1 Feb. 6, 2020

(30) Foreign Application Priority Data

Aug. 6, 2018 (JP) .............................. JP2018-147843

(51) Int. Cl.
*B60W 30/12* (2020.01)
*B62D 6/00* (2006.01)

(52) U.S. Cl.
CPC .............. *B60W 30/12* (2013.01); *B62D 6/00* (2013.01); *B60W 2520/10* (2013.01); *B60W 2555/60* (2020.02); *B60W 2710/202* (2013.01)

(58) Field of Classification Search
CPC ........ B62D 6/00; B62D 15/025; B62D 6/008; B60W 30/12; B60W 2520/10; B60W 2555/60; B60W 2710/202
USPC .......................................................... 701/41
See application file for complete search history.

(56) References Cited

U.S. PATENT DOCUMENTS

| 9,550,526 B2 * | 1/2017 | You ...................... B62D 15/025 |
| 10,000,209 B2 * | 6/2018 | Takaso ................. B62D 15/025 |
| 10,065,639 B2 * | 9/2018 | Taniguchi ............. B60W 30/12 |
| 11,124,236 B2 * | 9/2021 | Harada ................. B62D 15/025 |

FOREIGN PATENT DOCUMENTS

JP           2015-069341 A        4/2015

\* cited by examiner

*Primary Examiner* — Khoi H Tran
*Assistant Examiner* — Rodney P King
(74) *Attorney, Agent, or Firm* — Studebaker & Brackett PC

(57) ABSTRACT

A control unit functionally comprises a first steering-torque application control part which commands a steering actuator of a vehicle to execute application of a steering torque determined by a first steering characteristic CH1 and a second steering-torque application control part which commands the steering actuator of the vehicle to execute application of a steering torque determined by a second steering characteristic CH2. The first steering characteristic CH1 comprises plural characteristics CH1A-CH1J which have different steering torques changing according to a vehicle speed. The characteristics CH1A-CH1J are set according to the vehicle speed such that these gradually change in a manner CH1A→CH1J as the vehicle speed becomes higher. The steering torque applied to the steering wheel is set such that the higher the vehicle speed is, the smaller the steering torque is, as shown by the characteristics CH1A-CH1J.

13 Claims, 10 Drawing Sheets

VEHICLE CONTROL DEVICE AND VEHICLE CONTROL METHOD

BACKGROUND OF THE INVENTION

The present invention relates to a vehicle control device and a vehicle control method, and in particular to a steering assist technology of a vehicle.

A steering assist technology, such as a lane keeping steering assist to make a vehicle travel at a center of a lane or a lane departure prevention assist to prevent the vehicle from deviating from the lane, is applied to a vehicles, such as an automotive vehicle, as a kind of technology of previously preventing occurrence of an accident.

In the steering assist technology, it is important that intervention (execution) of the steering assist does not give any uncomfortable feeling to a driver as well as the safety being secured.

Japanese Patent Laid-Open Publication No. 2015-069341 discloses a technology in which two cases: one is that the lane departure prevention assist is executed only; the other is that both of the lane departure prevention assist and the lane keeping steering assist are executed, are set based on a vehicle speed of an own vehicle and a width of a lane on which the own vehicle travels. Specifically, according to the technology disclosed in the above-described patent document, both of the lane departure prevention assist and the lane keeping steering assist are executed in combination in a case where the width of the lane is larger than a specified width and the speed of the own vehicle is higher than a specified speed, whereas the lane departure prevention assist is executed only in the other case.

Herein, in the technology of the above-described patent document, a steering torque of the lane departure prevention assist which is used in a case where the width of the lane is the specified width or smaller and the speed of the own vehicle is the specified speed or lower is set to be smaller (i.e., weaker) than that which is used in the other case, considering existence of an obstacle on a road in an urban area or the like.

According to the above-described technology, however, since the lane keeping steering assist is executed in the state where the lane width is larger than the specified width and the vehicle speed is higher than the specified speed, it may be considered that troublesome or uncomfortable feelings are given to the driver.

That is, it may be normal that the driver does not want frequent intervention of the steering assist under a state where the vehicle travels on an expressway or the like. However, according to the above-described technology in which the lane keeping steering assist is executed under the situation of vehicle's traveling on the expressway or the like, the frequent intervention of the steering assist (lane keeping steering assist) may happen under this situation, so that troublesome or uncomfortable feelings may be given to the driver improperly.

Herein, the execution of the lane keeping steering assist is effective under a specified situation from a viewpoint of driver's burden reduction during the vehicle driving, so that it is desirable that not only the lane departure prevention assist but the lane keeping steering assist are executed.

SUMMARY OF THE INVENTION

The present invention has been devised in view of the above-described matter, and an object of the present invention is to provide a vehicle control device and a vehicle control method which can properly prevent troublesome/uncomfortable feelings or stress from being given to the driver during the vehicle driving, securing the high safety by preventing the vehicle's lane departure.

One aspect of the present invention is a vehicle control device for applying a steering force to a steering wheel of a vehicle according to a vehicle traveling condition, comprising a steering-force generator to generate the steering force applied to the steering wheel, a lane detector to detect a lane on which the vehicle travels, a vehicle-speed detector to detect a vehicle speed, and a controller to output a command signal to the steering-force generator based on detection results of the lane detector and the vehicle-speed detector, wherein the controller is configured to functionally comprise a first steering-force application control part for applying a first steering force to the steering wheel by means of the steering-force generator and a second steering-force application control part for applying a second steering force to the steering wheel by means of the steering-force generator, the first steering force is determined by a first steering characteristic which is operative to make the vehicle travel at a center of the lane, the second steering force is determined by a second steering characteristic, which is different from the first steering characteristic, which is operative to prevent the vehicle from deviating from the lane, and the first steering characteristic is set such that a magnitude of the first steering force determined by the first steering characteristic changes according to the vehicle speed detected by the vehicle-speed detector in such a manner that the higher the vehicle speed is, the smaller the magnitude of the first steering force is.

According to the present vehicle control device, since the first steering characteristic is set such that the higher the vehicle speed is, the smaller the magnitude of the first steering force is, application of the first steering force when the vehicle travels at a high speed or the like can be suppressed. Thereby, intervention of the lane keeping steering assist for making the vehicle travel at the center of the lane is so suppressed in a case where the vehicle speed is high that it can be properly prevented that troublesome or uncomfortable feelings are given to the driver.

Further, since the second steering force operative to prevent the vehicle from deviating from the lane is applied to the steering wheel, it can be securely prevented that the vehicle deviates from the lane, thereby securing the high safety of the vehicle traveling.

Consequently, the present vehicle control device can properly prevent troublesome/uncomfortable feelings or stress from being given to the driver during the vehicle driving, securing the high safety by preventing the vehicle's lane departure.

In an embodiment of the vehicle control device of the present invention, the first steering characteristic is set such that an application start point of the first steering force determined by the first steering characteristic changes according to the vehicle speed detected by the vehicle-speed detector in a case where the vehicle speed is a specified speed or higher in such a manner that the higher the vehicle speed is, the greater an offset degree of the application start point which is offset, in a width direction of the lane, from the center of the lane is.

According to this embodiment, since the first steering characteristic is set, in the case where the vehicle speed is the specified speed or higher, such that the higher the vehicle speed is, the greater the offset degree of the application start point which is offset, in the width direction of the lane, from the center of the lane is, intervention of the lane keeping steering assist can be suppressed when the vehicle travels at around the center of the lane. Accordingly, the control device of this embodiment can more properly prevent troublesome/uncomfortable feelings from being given to the driver.

In another embodiment of the vehicle control device of the present invention, the second steering characteristic is set such that an application start point of the second steering force determined by the second steering characteristic is located at a specified position which is inwardly spaced apart, in a width direction of the lane, from an outer end of the lane by a specified distance, and the controller is configured such that the second steering force determined by the second steering characteristic is applied to the steering wheel but the first steering force determined by the first steering characteristic is not applied to the steering wheel under a specified condition where the application start point of the second steering force is positioned on an inward side, in the width direction of the lane, of the application start point of the first steering force.

According to this embodiment, the application of the second steering force for the lane departure prevention is conducted only, without any application of the first steering force, under the specified condition. Accordingly, the vehicle control device of this embodiment can more properly prevent troublesome/uncomfortable feelings or stress from being given to the driver during the vehicle driving, securing the high safety.

In another embodiment of the vehicle control device of the present invention, the first steering characteristic is set such that an application start point of the first steering force determined by the first steering characteristic is located at the center of the lane in a case where the vehicle speed detected by the vehicle-speed detector is lower than a specified speed, and the first steering characteristic is set such that the magnitude of the first steering force determined by the first steering characteristic at the application start point of the first steering force in the case where the vehicle speed is lower than the specified speed changes according to the vehicle speed detected by the vehicle-speed detector in such a manner that the higher the vehicle speed is, the smaller the magnitude of the first steering force is.

According to this embodiment, the application of the first steering force can be conducted from the center of the lane by locating the application start point of the first steering force at the center of the lane in the case where the vehicle speed is lower than the specified speed. Thereby, the steering assist for making the vehicle travel at the center of the lane is executed when the vehicle travels at a relatively low speed, which is preferable from the viewpoint of driver's burden reduction.

Further, the first steering characteristic of this embodiment is set, in the case where the vehicle speed is lower than the specified speed and therefore the application start point of the first steering force is located at the center of the lane, such that the higher the vehicle speed is, the smaller the magnitude of the first steering force at the application start point of the first steering force is. Accordingly, the magnitude of the first steering force applied for making the vehicle travel at the center of the lane becomes smaller as the vehicle speed becomes higher even when the vehicle travels at the relatively slow speed, which is superior in preventing troublesome/uncomfortable feelings from being given to the driver as well as attaining the above-described driver's burden reduction.

In another embodiment of the vehicle control device of the present invention, in a case where the first steering characteristic and the second steering characteristic are shown by a characteristic diagram having two-dimensional coordinates with a horizontal axis as a position in a width direction of the lane and with a vertical axis as the magnitude of the steering force applied, the first steering characteristic includes a first steering-force increase part where the magnitude of the steering force gradually increases as the position changes from an inward side to an outward side in the width direction of the lane and the second steering characteristic includes a second steering-force increase part where the magnitude of the steering force gradually increases as the position changes from an inward side to an outward side in the width direction of the lane, and in a case where the vehicle speed detected by the vehicle-speed detector is within a specified speed range and a width of the lane is within a specified width range, a characteristic exchange point where the first steering characteristic and the second steering characteristic are exchanged is set, wherein the characteristic exchange point is positioned both in an area of the first steering-force increase part of the first steering characteristic and in an area of the second steering-force increase part of the second steering characteristic.

According to this embodiment, since the characteristic exchange point of the first steering characteristic and the second steering characteristic is positioned both in the area of the first steering-force increase part of the first steering characteristic and in the area of the second steering-force increase part of the second steering characteristic, an improperly-large change of the steering force which may be caused by the characteristic exchange can be prevented, so that this embodiment can more effectively prevent troublesome/uncomfortable feelings from being given to the driver during the vehicle driving.

In another embodiment of the vehicle control device of the present invention, the second steering force is larger than the first steering force.

According to this embodiment, since the lane departure prevention is attained by applying the second steering force which is larger than the first steering force, the lane departure can be more securely prevented, thereby securing the high safety properly.

In another embodiment of the vehicle control device of the present invention, in a case where the first steering characteristic is shown by a characteristic diagram having two-dimensional coordinates with a horizontal axis as a position in a width direction of the lane and with a vertical axis as the magnitude of the steering force applied, the first steering characteristic includes a first-steering-force maintenance part where the magnitude of the steering force is maintained over a specified position range which covers from the center of the lane to a specified outward position in the width direction of the lane in a case where the vehicle speed detected by the vehicle-speed detector is lower than a specified speed.

According to this embodiment, since the first steering characteristic includes the first-steering-force maintenance part where the magnitude of the steering force is maintained around the center of the lane in the case where the vehicle speed is lower than the specified speed, the steering force applied to the steering wheel does not change when the vehicle travels at a relatively low speed and at around the center of the lane. Accordingly, this embodiment can more effectively prevent troublesome/uncomfortable feelings from being given to the driver during the vehicle driving, compared to a case where the steering force changes regardless of the vehicle's traveling at around the lane center.

Another aspect of the present invention is a vehicle control method for applying a steering force to a steering wheel of a vehicle according to a vehicle traveling condition, comprising the steps of detecting a lane on which the vehicle travels, detecting a vehicle speed, and applying the steering force to the steering wheel based on detection results of the lane detection step and the vehicle-speed detection step, wherein the steering-force application step comprises a first steering-force application sub step of applying a first steering force to the steering wheel and a second steering-force application sub step of applying a second steering force to the steering wheel, the first steering force is determined by a first steering characteristic which is operative to make the vehicle travel at a center of the lane, the second steering force is determined by a second steering characteristic, which is different from the first steering characteristic, which is operative to prevent the vehicle from deviating from the lane, and the first steering characteristic is set such that a magnitude of the first steering force determined by the first steering characteristic changes according to the vehicle speed detected by the vehicle-speed detector in such a manner that the higher the vehicle speed is, the smaller the magnitude of the first steering force is.

According to the present vehicle control method, since the first steering characteristic is set such that the higher the vehicle speed is, the smaller the magnitude of the first steering force is, application of the first steering force when the vehicle travels at a high speed or the like can be suppressed. Thereby, intervention of the lane keeping steering assist for making the vehicle travel at the center of the lane is so suppressed in a case where the vehicle speed is high that it can be properly prevented that troublesome or uncomfortable feelings are given to the driver.

Further, since the second steering force operative to prevent the vehicle from deviating from the lane is applied to the steering wheel, it can be securely prevented that the vehicle deviates from the lane, thereby securing the high safety of the vehicle traveling.

Consequently, the present vehicle control method can properly prevent troublesome/uncomfortable feelings or stress from being given to the driver during the vehicle driving, securing the high safety by preventing the vehicle's lane departure.

In an embodiment of the vehicle control method of the present invention, the first steering characteristic is set such that an application start point of the first steering force determined by the first steering characteristic changes according to the vehicle speed detected by the vehicle-speed detector in a case where the vehicle speed is a specified speed or higher in such a manner that the higher the vehicle speed is, the greater an offset degree of the application start point which is offset, in a width direction of the lane, from the center of the lane is.

According to this embodiment, since the first steering characteristic is set, in the case where the vehicle speed is the specified speed or higher, such that the higher the vehicle speed is, the greater the offset degree of the application start point which is offset, in the width direction of the lane, from the center of the lane is, intervention of the steering assist can be suppressed when the vehicle travels at around the center of the lane. Accordingly, the vehicle control method of this embodiment can more properly prevent troublesome/ uncomfortable feelings from being given to the driver.

In another embodiment of the vehicle control method of the present invention, the second steering characteristic is set such that an application start point of the second steering force determined by the second steering characteristic is located at a specified position which is spaced apart, in the width direction of the lane, from an outer end of the lane by a specified distance, and the first steering-force application sub step and the second steering-force application sub step are executed in such a manner that the second steering force is applied to the steering wheel with execution of the second steering-force application sub step but the first steering force is not applied to the steering wheel without execution of the first steering-force application sub step under a specified condition where the application start point of the second steering force is positioned on an inward side, in the width direction of the lane, of the application start point of the first steering force.

According to this embodiment, application of the second steering force for the lane departure prevention is conducted only, without any application of the first steering force, under the specified condition. Accordingly, the vehicle control method of this embodiment can more properly prevent troublesome/uncomfortable feelings or stress from being given to the driver during the vehicle driving, securing the high safety.

In another embodiment of the vehicle control method of the present invention, the second steering force is larger than the first steering force.

According to this embodiment, since the lane departure prevention is attained by applying the second steering force which is larger than the first steering force, the lane departure can be more securely prevented, thereby securing the high safety properly.

Other features, aspects, and advantages of the present invention will become apparent from the following description which refers to the accompanying drawings.

DETAILED DESCRIPTION OF THE INVENTION

Figure 1:
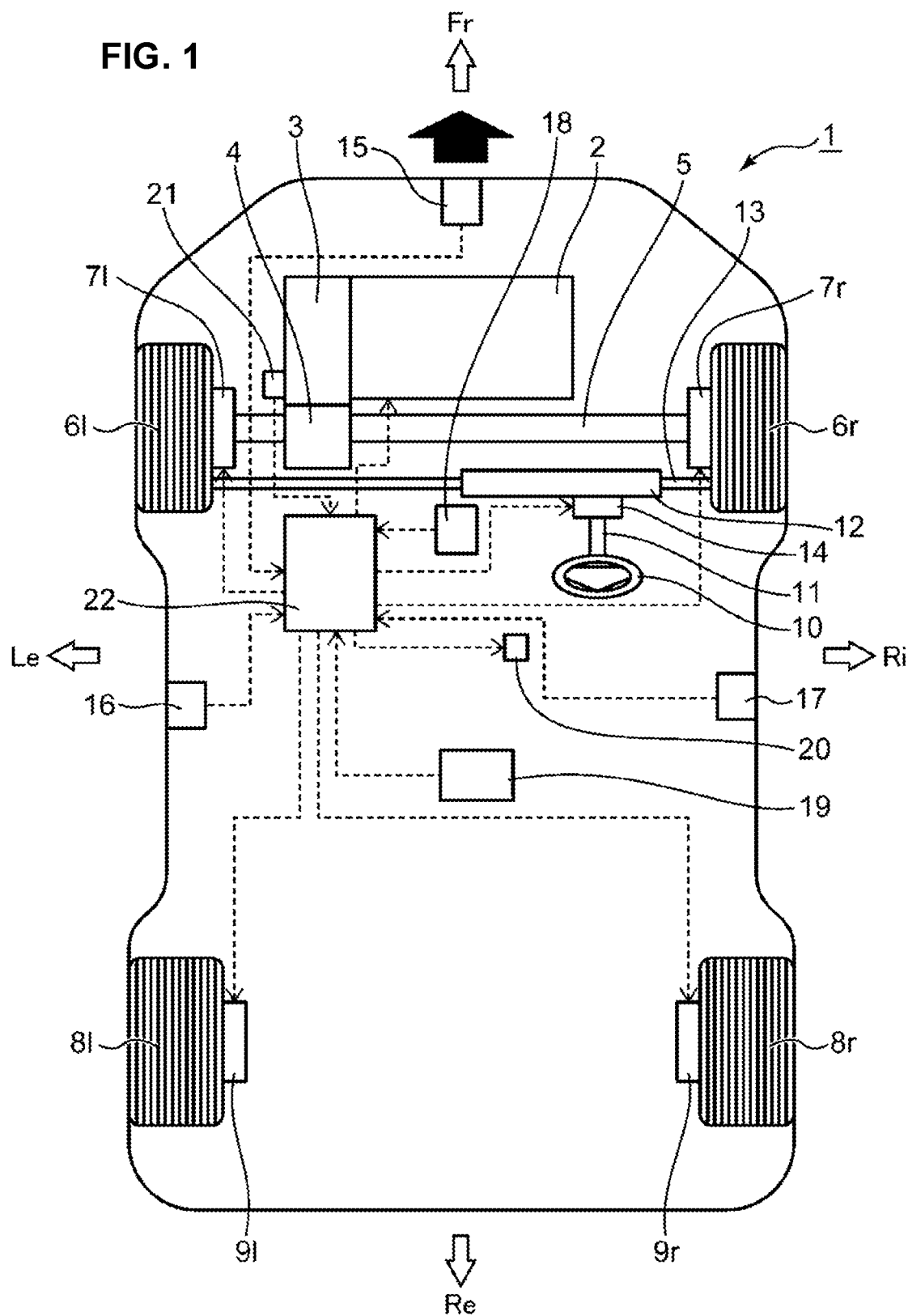
FIG. 1 is a schematic diagram showing a schematic configuration of a vehicle according to an embodiment of the present invention.

Hereafter, an embodiment of the present invention will be described referring to the drawings. The embodiment described here is merely one example of the present invention, and therefore the present invention should not be substantially limited to this embodiment.

In the figures used in the flowing description, "Fr" shows a forward direction (advancing direction) of an own vehicle, "Re" shows a rearward direction of the own vehicle, "Le" shows a leftward direction of the own vehicle, and "Ri" shows a rightward direction of the own vehicle,

EMBODIMENT

1. Schematic Configuration of Vehicle 1

A schematic configuration of a vehicle 1 according to the present embodiment will be described referring to FIGS. 1 and 2.

As shown in FIG. 1, the vehicle 1 comprises an engine 2 as a power (drive) source. A multi-cylinder gasoline engine is applied to the vehicle 1 of the present embodiment as an example of the engine 2.

A transmission 3 is coupled to the engine 2, and a deferential gear 4 is connected to the transmission 3. A drive shaft 5 extends in a lateral direction from the deferential gear 4. Right and left front wheels 6l, 6r are attached to end portions of the drive shaft 5.

The drive shaft 5 is provided with a left front brake 7l positioned near the left front wheel 6l and a right front brake 7r positioned near the right front wheel 6r.

Right and left rear wheels 8l, 8r are arranged at a rearward side of the vehicle 1. The right and left rear wheels 8l, 8r are respectively attached to rear frames, not illustrated. A left rear brake 9l is provided at a shaft (not illustrated) which rotatably supports the left rear wheel 8l, and a right rear brake 9r is provided at a shaft (not illustrated) which rotatably supports the right rear wheel 8r.

As shown in FIG. 1, a steering wheel 10 is provided in front of a driver's seat in a cabin of the vehicle 1. The steering wheel 10 is attached to a tip portion of a steering shaft 11. The other end of the steering shaft 11 is connected to a steering gear 12. Further, a steering actuator 14 is coupled to the steering shaft 11, whereby a steering torque (steering force) is applicable to the steering wheel 10 by way of the steering shaft 11. That is, the steering actuator 14 serves as a steering-force generator which generates the steering force.

A tie rod 13 is coupled to the steering gear 12. A direction of the front wheels 6l, 6r is changed according to a lateral move of the tie rod 13.

As shown in FIG. 1, the vehicle 1 is provided with three radars 15, 16, 17 and an outside-monitor camera 18. The radar 15 is arranged at a front portion of the vehicle 1, and the other radars 16, 17 are arranged at both side portions of the vehicle 1. These radars 15, 16, 17 are configured to detect another vehicle located around the own vehicle (vehicle 1) and a relative speed and distance between the own vehicle 1 and the other vehicle located around the vehicle 1.

The outside-monitor camera 18 detects both-side partition lines of a lane on which the vehicle 1 travels, whereby the lane on which the vehicle 1 travels is detected. That is, in the vehicle 1 according to the present embodiment, the outside-monitor camera 18 serves as a lane detector.

Further, the vehicle 1 is provided with a map-information storage 19. The map-information storage 19 stores information of roads on which the vehicle 1 travels and the like. The map information stored in the map-information storage 19 includes lane information of the roads.

Herein, the map-information storage 19 may have the function of communicating with a server provided outside, so that the vehicle 1 may be configured to obtain the road information and the like from the server through its successive communication.

Further, the vehicle 1 is provided with an alarm 20 which is capable of generating an alarm to a passenger.

A vehicle-speed sensor 21 to detect a vehicle speed of the vehicle 1 is coupled to an output shaft (not illustrated) of the transmission 3 of the vehicle 1. That is, the vehicle-speed sensor 21 serves as a vehicle-speed detector in the vehicle 1.

Further, the vehicle 1 is provided with a control unit 22. The control unit 22 incudes a microprocessor which comprises CPU, ROM, RAM and so on. As shown in FIGS. 1 and 2, the radars 15, 16, 17, the outside-monitor camera 18, the map-information storage 19, the vehicle-speed sensor 21, and the like are connected to the control unit 22, so that the control unit 22 receives various kinds of information from these.

The control unit 22 is configured to output command signals to the engine 2, the steering actuator 14, the alarm 20, and the brakes 7l, 7r, 9l, 9r based on the received information.

Figure 2:
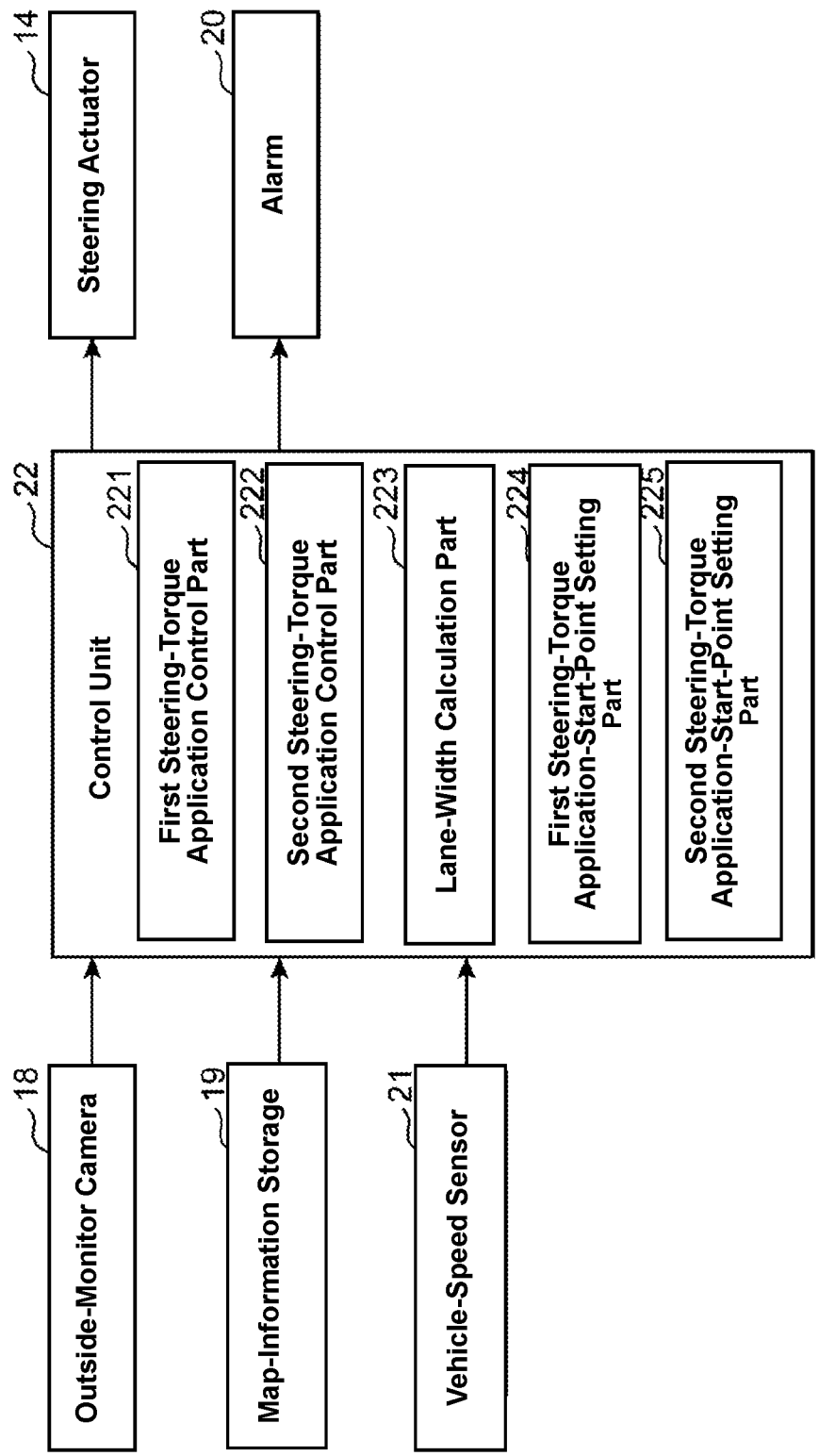
FIG. 2 is a bock diagram of a control of the vehicle.

Further, as shown in FIG. 2, the control unit 22 is configured to functionally comprise a first steering-torque (steering-force) application control part 221, a second steering-torque (steering-force) application control part 222, a lane-width calculation part 223, a first steering-torque application-start-point setting part 224, and a second steering-torque application-start-point setting part 225, which will be described specifically.

The control unit 22 serves as a controller of the vehicle 1.

2. Detection of Lane LN by Outside-Monitor Camera 18

Figure 3:
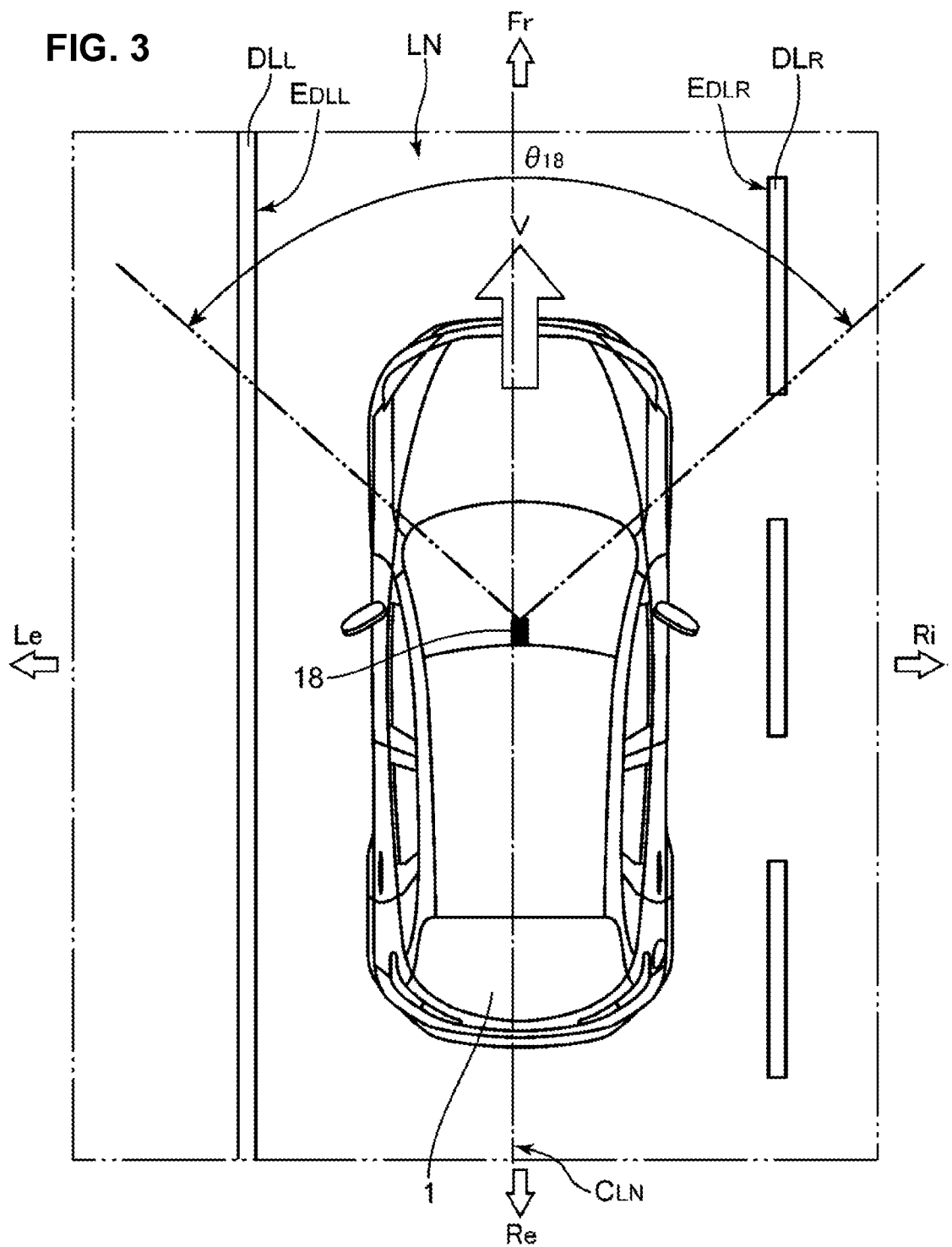
FIG. 3 is a schematic diagram for explaining detection of a lane by an outside-monitor camera.

Detection of a lane LN by the output camera 18 will be described referring to FIG. 3. FIG. 3 is a schematic diagram for explaining the detection of the lane LN by the outside-monitor camera 18.

As shown in FIG. 3, the outside-monitor camera 18 which is provided behind a windshield of the vehicle 1 inside the cabin is capable of detecting a forward range $\theta_{18}$ of the vehicle 1.

In the present embodiment, a left-side partition line (a roadway outside line) $DL_L$ is provided at a left side of the lane LN, and a right-side partition line (a roadway center line) $DL_R$ is provided at a right side of the lane LN.

The outside-monitor camera 18 can detect the left-side partition line $DL_L$ and the right-side partition line $DL_R$ at least. Herein, the outside-monitor camera 18 can detect respective inner ends $E_{DLL}$, $E_{DLR}$ of the partition lines $DL_L$, $DL_R$ as well.

The outside-monitor camera 18 executes the detection of the lane LN by detecting the left-side partition line $DL_L$ and the right-side partition line $DL_R$.

In the lane LN according to the present embodiment, an imaginary line, which passes through a central point between the inner end $E_{DLL}$ of the left-side partition line $DL_L$ and the inner end $E_{DLR}$ of the right-side partition line $DL_R$ and is parallel to both of the inner end $E_{DLL}$ of the left-side partition line $DL_L$ and the inner end $E_{DLR}$ of the right-side partition line $DL_R$, is defined as a lane center $C_{LN}$.

3. Traveling Condition of Vehicle 1

Figure 4:
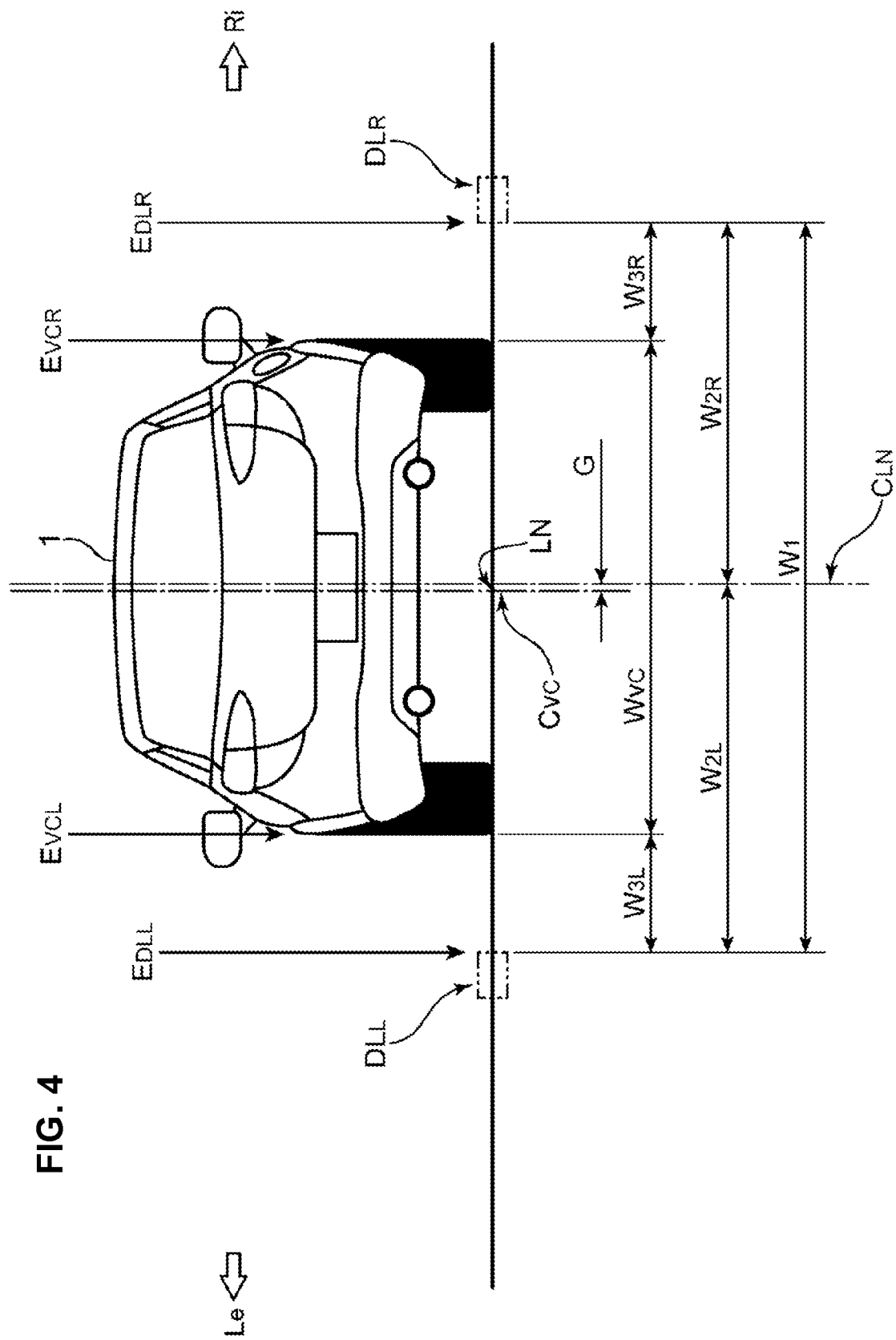
FIG. 4 is a schematic back view showing a vehicle position in a width direction of the lane.

Next, an example of the traveling condition of the vehicle 1 will be described referring to FIG. 4. FIG. 4 is a schematic back view of the vehicle 1, which shows a relative position of the vehicle 1 to the partition lines $DL_L$, $DL_R$.

As shown in FIG. 4, the lane-width calculation part 223 of the control unit 22 calculates a width $W_1$ between the inner end $E_{DLL}$ of the left-side partition line $DL_L$ and the inner end $E_{DLR}$ of the right-side partition line $DL_R$ based on results of images picked up by the outside-monitor camera 18. This lane-width calculation part 223 calculates right-and-left half widths $W_{2L}$, $W_{2R}$ of the lane LN from the width $W_1$ of the lane LN as well.

Further, the control unit 22 calculates a positional-displacement quantity G of a vehicle center $C_{VC}$ of the vehicle 1 relative to the lane center $C_{LN}$ of the lane LN based on the image results from the outside-monitor camera 18. Further, a distance $W_{3L}$ between a vehicle left-side end $E_{VCL}$ and the inner end $E_{DLL}$ of the left-side partition line $DL_L$ and a distance $W_{3R}$ between a vehicle right-side end $E_{VCR}$ and the inner end $E_{DLR}$ of the right-side partition line $DL_R$ are calculated from this calculation result and a vehicle width $W_{VC}$ of the vehicle 1.

Herein, the distance $W_{3L}$ and the distance $W_{3R}$ satisfy the following formula in a state where the lane center $C_{LN}$ of the lane LN and the vehicle center $C_{VC}$ of the vehicle 1 coincide with each other.

$$W_{3L} = W_{3R} \quad \text{(formula 1)}$$

Further, in the present embodiment, a positional-displacement quantity $G_{MAX}$ (allowed positional-displacement quantity) in a state where the vehicle left-side end $E_{VCL}$ and the inner end $E_{DLL}$ of the left-side partition line $DL_L$ coincide with each other and in a state where the vehicle right-side end $E_{VCR}$ and the inner end $E_{DLR}$ of the right-side partition line $DL_R$ coincide with each other is defined as follows.

$$G_{MAX} = (W_1 - W_{VC})/2 \quad \text{(formula 2)}$$

The first steering-torque application control part 221 and the second steering-torque application control part 222 of the control unit 22 command the steering actuator 14 to execute the steering-torque application based on the positional-displacement quantity G and the distances $W_{3L}$, $W_{3R}$ which are calculated as above and a vehicle speed V of the vehicle 1.

4. Setting of First Steering Characteristic CH1 and Second Steering Characteristic CH2 by Control Unit 22

Figure 5:
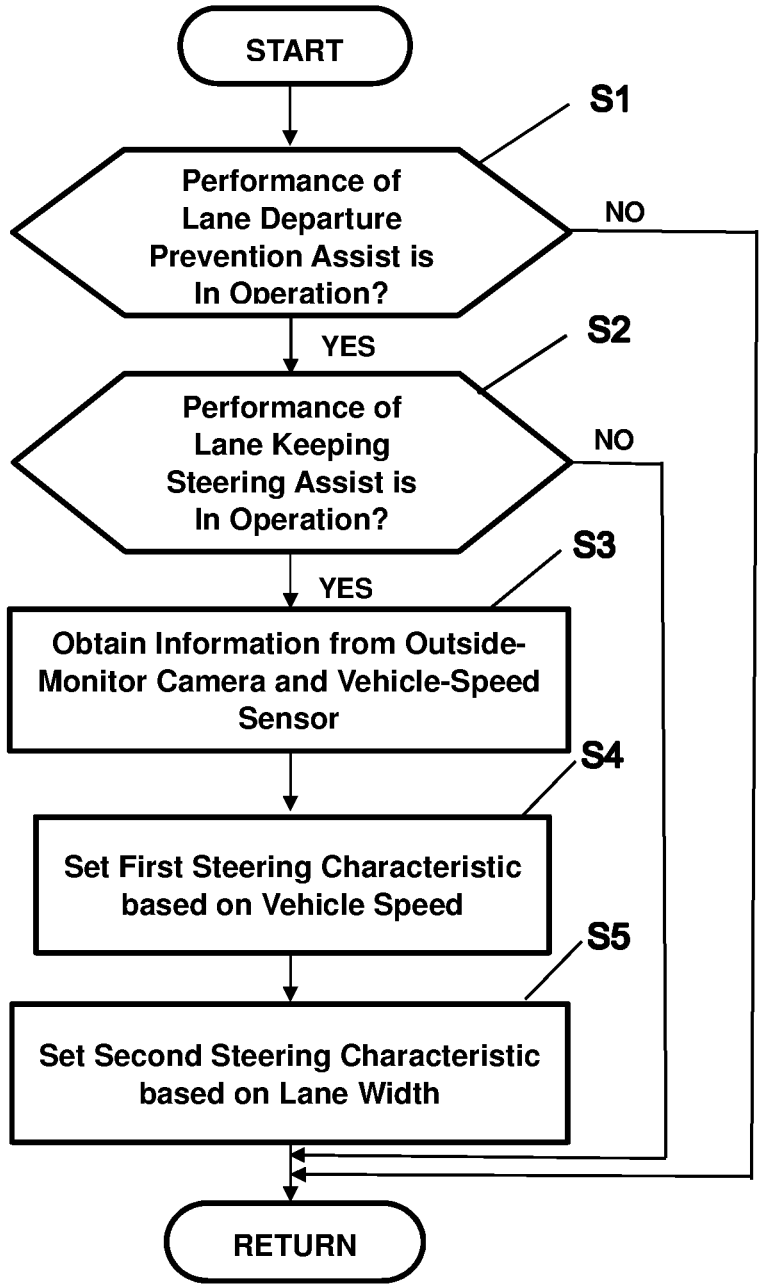
FIG. 5 is a flowchart of a setting method of first and second steering characteristics, which is executed by a controller.

Setting of the first steering characteristic CH1 and the second steering characteristic CH2 executed by the control unit 22 will be described referring to FIGS. 5 and 6. FIG. 5 is a flowchart of a setting method of the steering characteristics which is executed by the control unit 22, and FIG. 6 is a characteristic diagram showing an example of a relationship between the vehicle position in the width direction of the lane LN and the first and second steering characteristics CH1, CH2.

Figure 6:
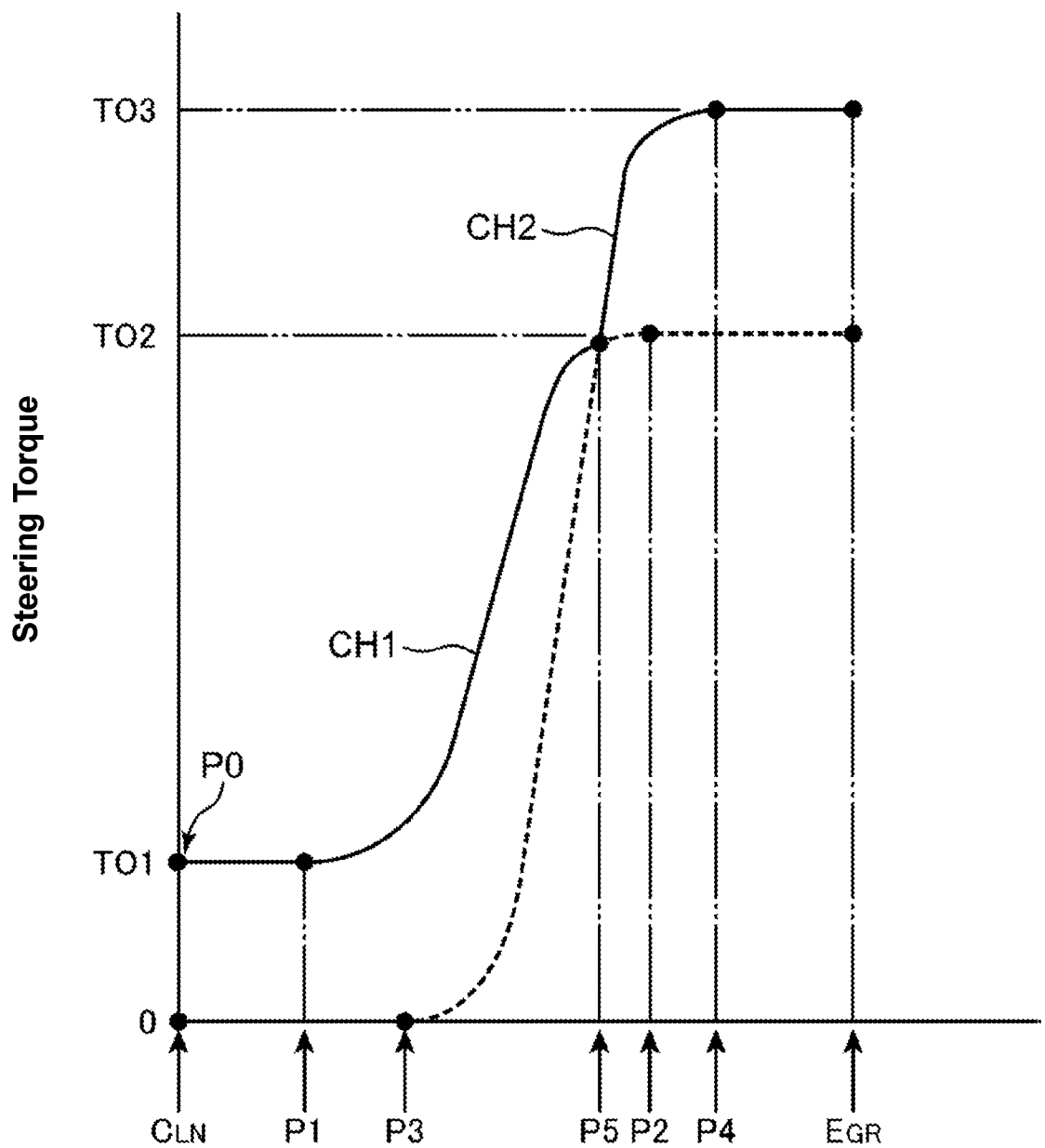
FIG. 6 is a characteristic diagram showing one example of a relationship between the vehicle position in the width direction of the lane and the first and second steering characteristics.

In FIG. 6, "$E_{GR}$" shows a position which is away from the lane center $C_{LN}$ of the lane LN by the allowed positional-displacement quantity $G_{MAX}$ to the right side, which will be referred to as "allowed right-end point $E_{GR}$" in the following description.

As shown in FIG. 5, the control unit 22 determines whether respective performances of the lane departure prevention assist and the lane keeping steering assist are in operation or not (step S1, step S2). These determinations are provided, considering a possibility that a vehicle driver can selectively cancel either one or both of the above-described assist performances.

In a case where it is determined that at least one of the performances of the lane departure prevention assist and the lane keeping steering assist is not in operation (i.e., cancelled) (NO in the step S1, NO in the step S2), a control sequence of the control unit 22 is returned.

Meanwhile, in a case where it is determined that both of the performances of the lane departure prevention assist and the lane keeping steering assist are in operation, information (detection results) from the outside-monitor camera 18 and the vehicle-speed sensor 21 are obtained (step S3).

As described above, the lane-width calculation part 223 of the control unit 22 calculates the width $W_1$ of the lane LN, the allowed positional-displacement quantity $G_{MAX}$ of the above-described (formula 2), and so on based on the detection results of the outside-monitor camera 18.

Next, the first steering-torque application control part 221 of the control unit 22 sets the first steering characteristic CH1 based on the detection results (the vehicle speed V of the vehicle 1) of the vehicle-speed sensor 21 (step S4). The first steering characteristic CH1 is a characteristic to define the steering torque applied to the steering wheel 10 of the vehicle 1 for making the vehicle 1 travel at a center of the lane (i.e., for the lane keeping steering assist), which is set, as shown in FIG. 6 as one example, such that an magnitude of torque between a first torque TO1 and a second torque TO2 is set for each position in the width direction of the lane.

Specifically, in the first steering characteristic CH1 shown in FIG. 6, a first steering-torque application-start point P0 is set at the lane center $C_{LN}$ of the lane LN by the first steering-torque application-start-point setting part 224. Further, the first steering characteristic CH1 is set such that the first torque TO1 is applied in a case where the vehicle center $C_{VC}$ is positioned between the lane center $C_{LN}$ and an outside point P1 in the width direction of the lane LN.

The first steering characteristic CH1 shown in FIG. 6 is set such that the magnitudes of steering torque gradually change from the first torque TO1 to the second torque TO2 in a case where the vehicle center $C_{VC}$ is positioned between the above-described point P1 and a point P2 which is located on a further outside in the width direction of the lane LN. Meanwhile, in a case where the vehicle center $C_{VC}$ is positioned between the above-described point P2 and the allowed right-end point $E_{GR}$, the first steering characteristic CH1 is set such that the second torque TO2 is maintained.

Herein, as shown in FIG. 6, the first steering characteristic CH1 is set such that in its partial area located on the outside of the point P1 and its partial area located on the inside of the point P2, the magnitude of the steering torque changes not in a liner-function manner but in a quadratic-function manner, an exponential-function, or a logarithmic-function manner.

Returning to FIG. 5, the second steering-torque application control part 222 of the control unit 22 sets the second steering characteristic CH2 based on the lane width $W_1$ calculated by the lane-width calculation part 223 (step S5). The second steering characteristic CH2 is a characteristic to define the steering torque applied to the steering wheel 10 of the vehicle 1 for preventing the lane departure of the vehicle 1 (i.e., for the lane departure prevention assist), which is set, as shown in FIG. 6 as one example, such that an magnitude of torque having an upper limit of a third torque TO3 is set for each position in the width direction of the lane.

Specifically, in the first steering characteristic CH2 shown in FIG. 6, a second steering-torque application-start point P3 is set at a midway point in the width direction of the lane LN by the second steering-torque application-start-point setting part 225. Further, the second steering characteristic CH2 shown in FIG. 6 is set such that the magnitude of the steering torque gradually changes from "0" to the third torque TO3 in a case where the vehicle center $C_{VC}$ is positioned between the second steering-torque application-start point P3 and a point P4 which is located on the outside of the point P3. Meanwhile, in a case where the vehicle center $C_{VC}$ is positioned between the above-described point P4 and the allowed right-end point $E_{GR}$, the second steering characteristic CH2 is set such that the third torque TO3 is maintained.

Herein, as shown in FIG. 6, the second steering characteristic CH2 is also set such that in its partial area located on the outside of the second steering-torque application-start point P3 and its partial area located on the inside of the point P4, the magnitude of the steering torque changes not in the liner-function manner but in the quadratic-function manner, the exponential-function, or the logarithmic-function manner.

While the examples of the first steering characteristic CH1 and the second steering characteristic CH2 have been described referring to FIG. 6 for a case where the vehicle center $C_{VC}$ is positioned in the area from the lane center $C_{LN}$ of the lane LN to the allowed right-end point $E_{GR}$, these characteristics CH1, CH2 are set such that their left parts for a case where the vehicle center $C_{VC}$ is positioned in the area from the lane center $C_{LN}$ of the lane LN to an allowed left-end point is symmetrical to the right parts shown in FIG. 6.

The above-described allowed left-end point means a position which is located away from the lane center $C_{LN}$ of the lane LN by the above-described allowed positional-displacement quantity $G_{MAX}$ to the left side, which is symmetrical to the allowed right-end point $E_{GR}$ in relation to the lane center $C_{LN}$.

5. Steering Torques ST1, ST2 Applied to Steering Wheel 10 of Vehicle 1

A relationship between the position, in the width direction of the lane LN, of the vehicle 1 and steering torques ST1, ST2 applied to the steering wheel 10 of the vehicle 1 will be described referring to FIGS. 6 and 7A, B. FIG. 7A is a schematic plan view showing a case where the vehicle 1 is located to the right of the lane center $C_{LN}$, and FIG. 7B is a schematic plan view showing a case where the vehicle 1 is located further to the right of the lane center $C_{LN}$.

First, a situation shown in FIG. 7A where the vehicle center $C_{VC}$ of the vehicle 1 traveling at a vehicle speed V1 is displaced to the right (an arrow A) from the lane center $C_{LN}$ of the lane LN by a positional-displacement quantity G1 is supposed. The positional-displacement quantity G1 of the vehicle center $C_{VC}$ is a displacement quantity between the lane center $C_{LN}$ and a cross point of the first steering characteristic CH1 and the second steering characteristic CH2 (a characteristic exchange point P5) shown in FIG. 6.

According to the situation shown in FIG. 7A, the steering torque ST1 determined by the first steering characteristic CH1 is applied to the steering wheel 10 of the vehicle 1. Thereby, the vehicle 1 is controlled (assisted) so that the vehicle center $C_{VC}$ can be returned to the lane center $C_{LN}$ of the lane LN.

Figure 7B:
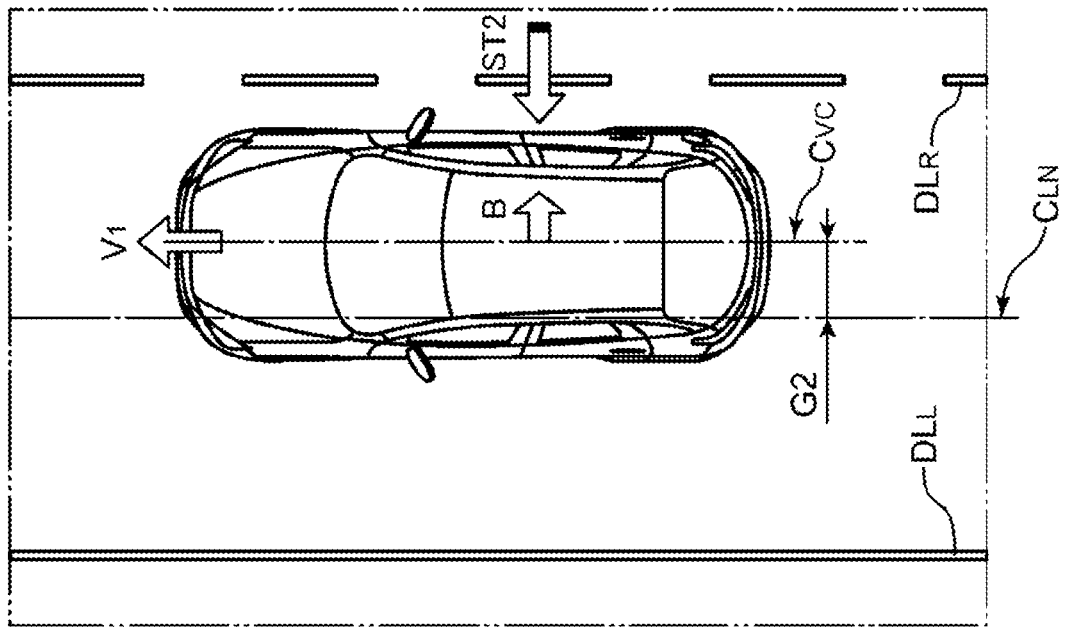
FIG. 7B is a schematic plan view showing a case where the vehicle is located further to the right of center.
Figure 7A:
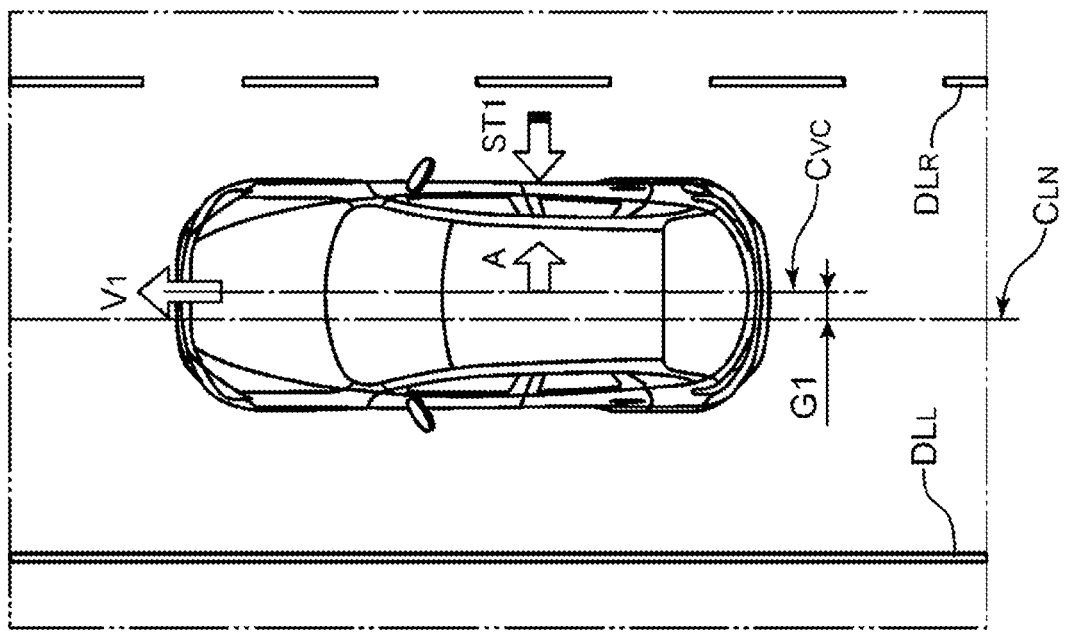
FIG. 7A is a schematic plan view showing a case where the vehicle is located to the right of center.

Next, a situation shown in FIG. 7B where the vehicle center $C_{VC}$ of the vehicle 1 is displaced further to the right (an arrow B) from the lane center $C_{LN}$ of the lane LN by a positional-displacement quantity G2 is supposed. The positional-displacement quantity G2 of the vehicle center $C_{VC}$ is a displacement quantity between the characteristic exchange point P5 and the allowed right-end point $E_{GR}$ shown in FIG. 6.

According to the situation in FIG. 7B, the steering torque ST2 determined by the second steering characteristic CH2 is applied to the steering wheel 10 of the vehicle 1. Thereby, the vehicle 1 is controlled (assisted) so that the vehicle right-side end $E_{VCR}$ can be prevented from deviating from the right-side partition line $D_{LR}$ to the outside.

6. Relationship Between Vehicle Speed V of Vehicle 1 and First Steering Characteristic CH1

Figure 8:
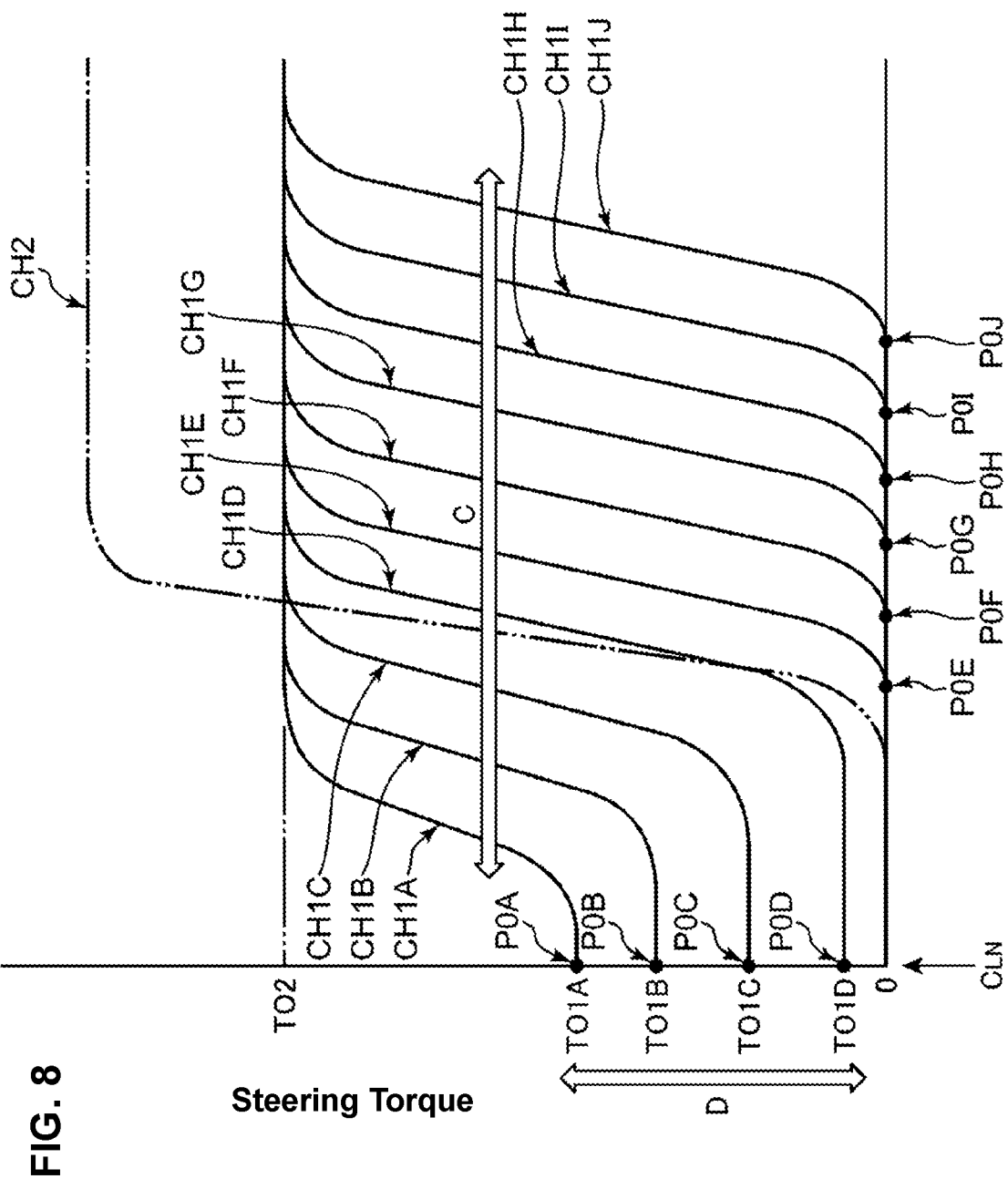
FIG. 8 is a characteristic diagram showing a relationship between a vehicle speed and the set first steering characteristic.

A relationship between the vehicle speed V of the vehicle 1 and the set first steering characteristic CH1 will be described referring to FIG. 8. FIG. 8 is a characteristic diagram showing the relationship between the vehicle speed V of the vehicle 1 and the set first steering characteristic CH1.

As shown in FIG. 8, in the vehicle 1 according to the present embodiment, the set first steering characteristic CH1 changes according to the vehicle speed V of the vehicle 1 in a manner of CH1A-CH1J (an arrow C). Herein, while the first steering characteristic CH1 changing according to the vehicle speed V is shown in FIG. 8 by picking up characteristics CH1A-CH1J, the first steering characteristic CH1 is configured such that there exist other characteristics between adjacent characteristics and also on a low-speed side of the characteristic CH1A or on a high-speed side of the characteristic CH1J.

Specifically, as shown in FIG. 8, in a case where the vehicle speed V is in a relatively-low speed range, the characteristics CH1A-CH1D of the first steering characteristic CH1 are set such that the first steering-torque application-start point P0 changes according to the vehicle speed V in a manner of P0A-P0D which are positioned at the lane center $C_{LN}$.

These characteristics CH1A-CH1D of the first steering characteristic CH1 gradually change in a manner of CH1A→CH1B→CH1C→CH1D as the vehicle speed V increases.

Herein, as shown in FIG. 8, the first steering torque TO1 changes in a manner of TO1A→TO1B→TO1C→TO1D shown by an arrow D as the vehicle speed V increases even in the case where the vehicle speed V is in the relatively-low speed range.

In the present embodiment, the vehicle speed between the vehicle speed V related to setting of the characteristic CH1D and the vehicle speed V related to setting of the characteristic CH1E corresponds to a "specified speed."

In a case where the vehicle speed V is in a relatively-high speed range, the characteristics CH1E-CH1J of the first steering characteristic CH1 are set such that the first steering-torque application-start point P0 gradually changes in the width direction of the lane LN in a manner of P0E-P0J.

These characteristics CH1E-CH1J of the first steering characteristic CH1 gradually change in a manner of CH1E→CH1F→CH1G→CH1H→CH1I→CH1J as the vehicle speed V increases even in the case where the vehicle speed V is in the relatively-high speed range.

In the present embodiment, as one example, the first steering characteristic CH1 is configured such that the characteristics CH1A, CH1B, CH1C, CH1D, CH1E, CH1F, CH1G, CH1H, CH1I, CH1J correspond to the vehicle speeds V of 36 km/h, 43 km/h, 50 km/h, 57 km/h, 64 km/h, 71 km/h, 78 km/h, 85 km/h, 92 km/h and 99 km/h, respectively.

Further, as described above, the characteristic CH1 shown in FIG. 8 is set such that there exist other characteristics between adjacent characteristics and also on the low-speed side or on the high-speed side thereof.

Moreover, while FIG. 8 shows a case where the vehicle center $C_{VC}$ is positioned on the right side of the lane center $C_{LN}$ only, the first steering characteristic CH1 is configured such that there are also other characteristics in a case where the vehicle center $C_{VC}$ is positioned on the left side of the lane center $C_{LN}$, which are symmetrical to the characteristics CH1A-CH1J.

7. Relationship Between Width $W_1$ of Lane LN and Second Steering Characteristic CH2

Figure 9:
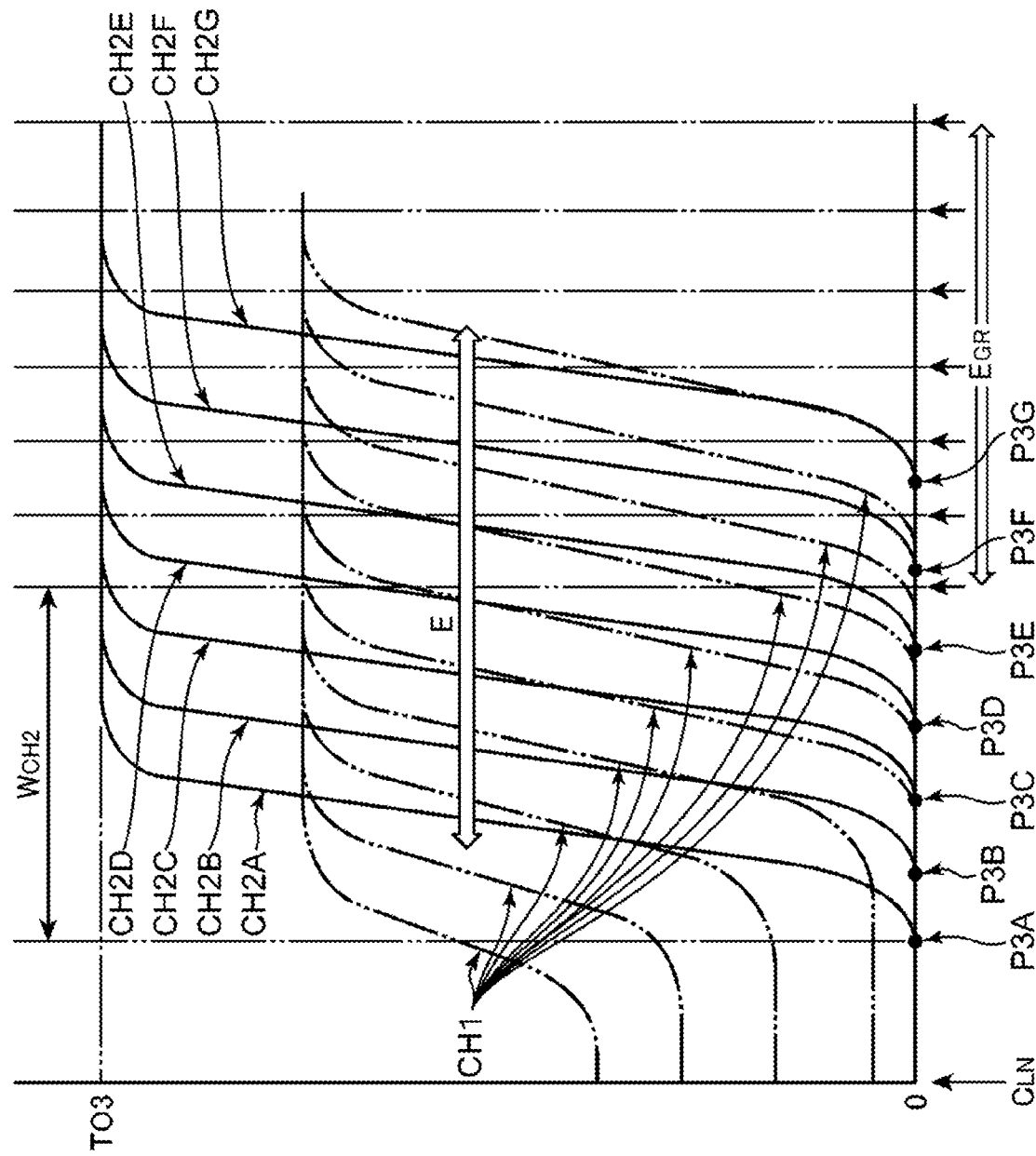
FIG. 9 is a characteristic diagram showing the second steering characteristic which is set in association with a width of the lane.

A relationship between the width $W_1$ of the lane LN and the set second steering characteristic CH2 will be described referring to FIG. 9. FIG. 9 is a characteristic diagram showing the second steering characteristic CH2 which is set in association with the allowed right-end point $E_{GR}$ which is defined from the width $W_1$ of the lane LN and the width $W_{VC}$ of the vehicle 1.

As shown in FIG. 9, the allowed right-end point $E_{GR}$ which becomes a standard in setting the second steering characteristic CH2 changes along the width direction of the lane LN according to a quantity (wideness/narrowness) of the width $W_1$ of the lane LN. Herein, the second steering characteristic CH2 also changes according to this width-directional change of the allowed right-end point $E_{GR}$ in a manner of CH2A-CH2G (an arrow E). Herein, while the first steering characteristic CH2 changing according to the width-directional position of the allowed right-end point $E_{GR}$ is shown in FIG. 9 by picking up characteristics CH2A-CH2G, this characteristic CH2 is configured such that there exist other characteristics between adjacent characteristics and also on an outside range or on an inside range in the lane width direction.

Specifically, as shown in FIG. 9, in the vehicle 1 of the present embodiment, a distance between the allowed right-end point $E_{GR}$ and the second steering-torque application-start point P3 which is defined on the inside of the this point $E_{GR}$ is set at a constant distance $W_{CH2}$. Accordingly, the characteristics CH2A-CH2G of the second steering characteristic CH2 are set according to the position of the allowed right-end point $E_{GR}$. In other words, respective second steering-torque application-start points P3A-P3G of the characteristics CH2A-CH2G of the second steering characteristic CH2 are set at points which are inwardly offset, by the distance $W_{CH2}$, from the respective allowed right-end points $E_{GR}$ which are the standard in setting the respective characteristics.

Herein, for any of the characteristics CH2A-CH2G of the second steering characteristic CH2, a lower limit of the steering torque is "0" and an upper limit is the third torque TO3.

While FIG. 9 shows a case where the vehicle center $C_{VC}$ is positioned on the right side of the lane center $C_{LN}$ only, the second steering characteristic CH2 is configured such that there are also other characteristics which have the standard of the allowed left-end point in a case where the vehicle center $C_{VC}$ is positioned on the left side of the lane center $C_{LN}$, which are symmetrical to the characteristics CH2A-CH2G.

8. Characteristic Exchange Method of First Steering Characteristic CH1 and Second Steering Characteristic CH2

Figure 10:
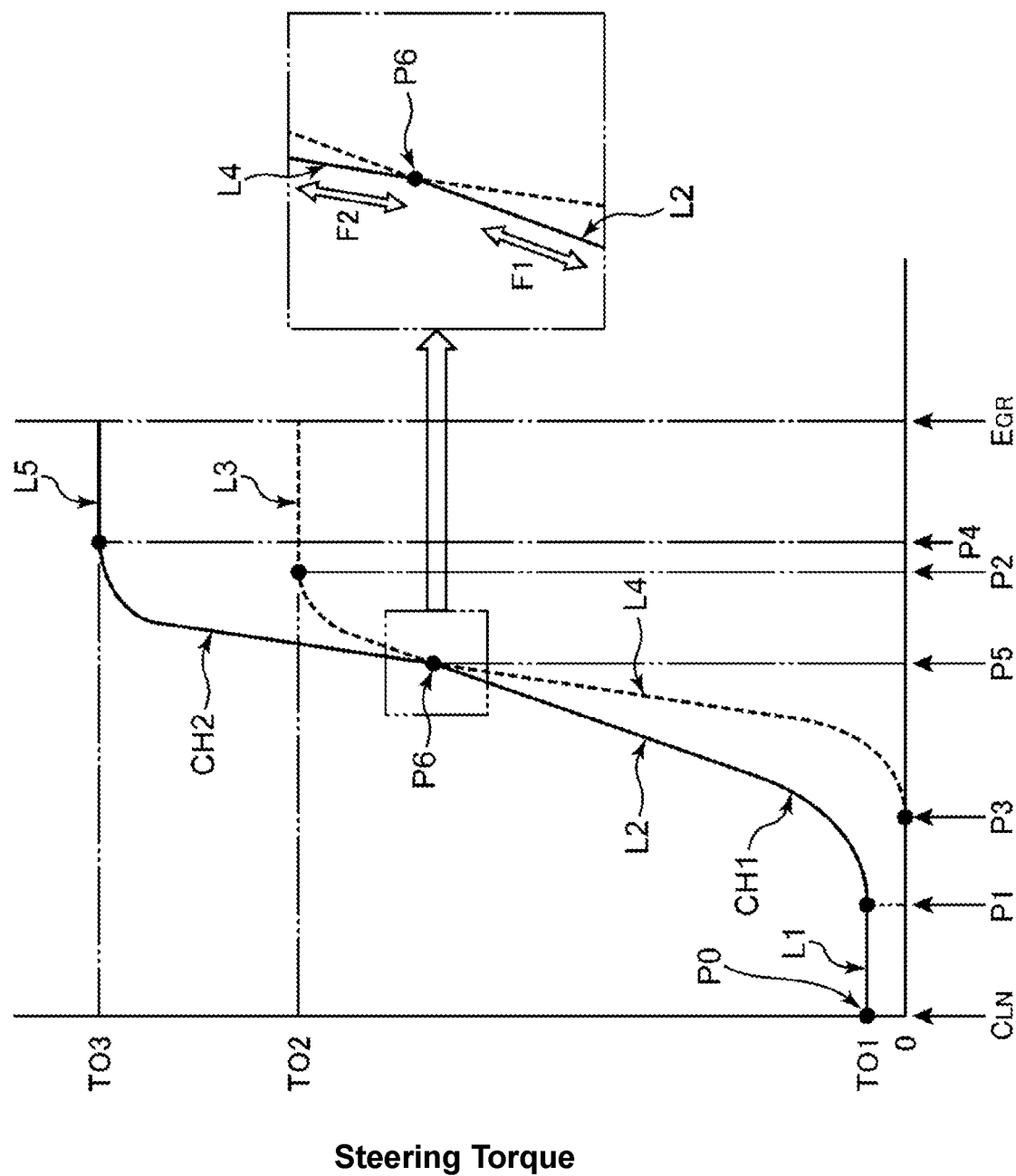
FIG. 10 is a characteristic diagram showing a characteristic exchange method of the first steering characteristic and the second steering characteristic in a case where the vehicle travels at a specified speed on the lane having a specified width.

A method of characteristic exchange of the first steering characteristic CH1 and the second steering characteristic CH2 in a case where the vehicle 1 travels at a specified speed on the lane having a specified width will described referring to FIG. 10. FIG. 10 is a characteristic diagram showing the characteristic exchange method of the first steering characteristic CH1 and the second steering characteristic CH2 in the case where the vehicle 1 travels at the specified speed on the lane LN having the specified width.

As shown in FIG. 10, in a case where the vehicle 1 travels at a relatively low speed, the first steering characteristic CH1 comprises a torque maintenance part L1, a torque increase part L2, and a torque maintenance part L3. The torque maintenance part L1 is an area where the first torque TO1 is maintained between the lane center $C_{LN}$ and the point P1.

The torque maintenance part L1 corresponds to a "first steering-force maintenance part" (in Claim 7). Likewise, an area from the lane center $C_{LN}$ to the point P1 corresponds to a "specified position range which covers from the center of the lane to a specified outward position," and the first torque TO1 corresponds to the "magnitude of the steering force" to be maintained in the above-described "specified position range."

The torque increase part L2 corresponds to a "first steering-force increase part" (in Claim 5), where the steering torque gradually increases from the point P1 toward the point P2. The torque maintenance part L3 is an area where the second torque TO2 is maintained between the point P2 and the allowed right-end point $E_{GR}$.

The second steering characteristic CH2 comprises a torque increase part L4 and a torque maintenance part L5. The torque increase part L4 corresponds to a "second steering-force increase part" (in Claim 5), where the steering torque gradually increases from the second steering-torque application-start point P3 toward the point P4. The torque maintenance part L5 is an area where the third torque TO3 is maintained between the point P4 and the allowed right-end point $E_{GR}$.

In a case where the vehicle speed V of the vehicle 1 is a specified speed and the allowed right-end point $E_{GR}$ defined by the width $W_1$ of the lane on which the vehicle 1 travels is located at a specified position, a cross point P6 where the torque increase part L2 of the first steering characteristic CH1 and the torque increase part L4 of the second steering characteristic CH2 is provided as shown in FIG. 10. This cross point P6 is a point which coincides with the characteristic exchange point P5.

As shown in an enlarged part of FIG. 10, which shows a characteristic diagram having two-dimensional coordinates with a horizontal axis as a position in the width direction of the lane LN and with a vertical axis as the steering torque applied, the steering torque of the torque increase part L2 and the steering torque of the torque increase part L4 gradually change in the same inclined direction around the cross point P6 as shown by arrows F1, F2. Thereby, fluctuation of the steering torque which a driver feels at the exchange from the first steering characteristic CH1 to the second steering characteristic CH2 can be made properly small, so that it can be properly prevented that troublesome or uncomfortable feelings are given to the driver.

While FIG. 10 shows a case where the vehicle center $C_{VC}$ is positioned on the right side of the lane center $C_{LN}$ only, there can be the characteristic exchange point P5 having a similar relationship even in a case where the vehicle center $C_{VC}$ is positioned on the left side of the lane center $C_{LN}$.

9. Effects

Since the first steering characteristic CH1 is set in the vehicle 1 according to the present embodiment such that the higher the vehicle speed V is, the smaller the steering torque is, application of the steering torque ST1 for making the vehicle 1 travel at the lane center when the vehicle 1 travels at the high speed or the like can be suppressed. Thereby, in the vehicle 1 according to the present embodiment, intervention of the lane keeping steering assist for making the vehicle 1 travel at the lance center is so suppressed in the case where the vehicle speed V is high that it can be properly prevented that troublesome or uncomfortable feelings are given to the driver.

Further, since the steering torque ST2 for preventing the vehicle 1 from deviating from the lane LN is applied in the vehicle 1 according to the present embodiment, it can be securely prevented that the vehicle 1 deviates from the lane LN, thereby securing the high safety of the vehicle traveling.

Moreover, since the steering characteristic CH1 is set in the vehicle 1 according to the present embodiment, in the case where the vehicle speed V is a relatively high, such that the higher the vehicle speed V is, the greater the offset degree of the first steering-torque application start point P0 which is offset, in the width direction of the lane, from the center of the lane LN is (P0E-P0J of FIG. 8), intervention of the lane keeping steering assist can be suppressed when the vehicle 1 travels at around the lane center $C_{LN}$. Accordingly, the vehicle 1 according to the present embodiment can more properly prevent troublesome/uncomfortable feelings from being given to the driver Also, in the vehicle 1 according to the present embodiment, the steering torque ST2 determined by the second steering characteristic CH2 for the lane departure prevention is applied to the steering wheel 10 of the vehicle 1 only, without any application of the steering torque ST1 determined by the first steering characteristic CH1 for the lane keeping steering assist, under a specified condition where the width $W_1$ of the lane LN is relatively narrow and the vehicle speed V is the specified speed or higher. In other words, in a case where the relationship between the characteristic CH1E-CH1J of the first steering characteristic CH1 and the second steering characteristic CH2, which is shown in FIG. 8, is satisfied, the application of the steering torque ST1 determined by the first steering characteristic CH1 is substantially cancelled.

Accordingly, the vehicle 1 according to the present embodiment can more properly prevent troublesome/uncomfortable feelings or stress from being given to the driver during the vehicle driving, securing the high safety.

Further, in the vehicle 1 according to the present embodiment, the application of the steering torque ST1 is conducted from the lane center $C_{LN}$ by locating the first steering-torque application-start point P0 for the lane keeping steering assist at the lance center $C_{LN}$ in the case where the vehicle speed V is relatively low (lower than the specified speed). Thereby, the steering assist for making the vehicle 1 travel at the lance center is executed when the vehicle 1 travels at the relatively low speed, which is preferable from the viewpoint of driver's burden reduction.

Further, in the vehicle 1 according to the present embodiment, the first steering characteristic CH1 is set, in the case where the vehicle speed V is the relatively low speed (lower than the specified speed) and therefore the first steering-torque application-start point P0 is located at the lane center $C_{LN}$, such that the higher the vehicle speed V is, the smaller the steering torque TO1 at the first steering-torque application start point P0 is in the manner of TO1A→TO1B→TO1C→TO1D. Accordingly, in the vehicle 1 according to the present embodiment, the steering torque TO1 applied for the lane keeping steering assist becomes smaller as the vehicle speed V becomes higher even when the vehicle 1 travels at the relatively slow speed, which is superior in preventing troublesome/uncomfortable feelings from being given to the driver as well as attaining the driver's burden reduction.

Moreover, as described referring to the characteristic diagram (having the two-dimensional coordinates with the horizontal axis as the position in the width direction of the lane and with the vertical axis as the steering torque applied) of FIG. 10, in the vehicle 1 according to the present embodiment, since the characteristic exchange point P5 of the first steering characteristic CH1 and the second steering characteristic CH2 is positioned both in the area of the steering-torque increase part L2 of the first steering characteristic CH1 and in the area of the steering-torque increase part L4 of the second steering characteristic CH2 and also the inclined direction of these are set in the same direction, an improperly-large change of the steering torques ST1, ST2 which may be caused by the characteristic exchange can be prevented, thereby more effectively preventing troublesome/uncomfortable feelings from being given to the driver during the vehicle driving.

Also, in the vehicle 1 according to the present embodiment, since the lane departure prevention is attained by applying the steering torque ST2 determined by the second steering characteristic CH2 which is larger than the steering torque ST1 determined by the first steering characteristic CH1 to the steering wheel 10 of the vehicle 1, the lane departure of the vehicle 1 can be more securely prevented, thereby securing the high safety properly.

Further, in the vehicle 1 according to the present embodiment, since each of the characteristics CH1A-CH1D of the first steering characteristic CH1 includes the torque maintenance part L1 where the steering torque is maintained at the side of the lane center $C_{LN}$ of the lane LN (see FIG. 10) in the case where the vehicle speed V is lower than the specified speed (CH1A-CH1D of FIG. 8), the steering torque applied to the steering wheel 10 of the vehicle 1 does not change when the vehicle 1 travels at the relatively low speed and around the lane center $C_{LN}$ of the lane LN. Accordingly, the present embodiment can more effectively prevent troublesome/uncomfortable feelings from being given to the driver during the vehicle driving, compared to a case where the steering torque changes regardless of the vehicle's traveling at around the lane center $C_{LN}$.

Accordingly, the vehicle 1 according to the present embodiment can properly prevent troublesome/uncomfortable feelings or stress from being given to the driver during the vehicle driving, securing the high safety by preventing the vehicle's lane departure by means of the control unit 22 which executes the above-described steering assist control.

MODIFIED EXAMPLE

While the above-described embodiment is configured such that the first steering characteristic CH1 (CH1A-CH1D) set in the case where the vehicle speed V of the vehicle 1 is the relatively low includes the torque maintenance part L1, the present invention is not limited to this. For example, the first steering characteristic may be configured to comprise the torque increase part L2 and the torque maintenance part L3, similarly to the characteristics CH1E-CH1J set in the case the vehicle speed V is relatively high.

While the second steering characteristic CH2 of the above-described embodiment is configured such that the second steering-torque application-start point P3 is set at the point which is inwardly offset, by the distance $W_{CH2}$ (60 cm, for example), from the allowed right-end point $E_{GR}$ or the allowed left-end point which are the standard in setting the steering characteristic, the present invention is not limited to this. For example, the distance $W_{CH2}$ may be configured to change according to the width $W_1$ of the lane LN or the vehicle speed V. More specifically, the distance $W_{CH2}$ may be configured such that the higher the vehicle speed V is, the larger the distance $W_{CH2}$ is, or that the wider the width $W_1$ of the lane LN is, the larger the distance $W_{CH2}$ is.

While the above-described embodiment did not refer to performance (role) of the alarm 20, this alarm 20 may be configured to issue a warning in a situation where the vehicle center $C_{VC}$ of the vehicle 1 becomes so close to the allowed right-end point $E_{GR}$ or the allowed left-end point, for example. More specifically, the alarm 20 may issue the warning to the driver when the vehicle center $C_{VC}$ of the vehicle 1 is located at a position on the outside, in the width direction, of the point P4.

Further, the vehicle speed V may be decreased by controlling the engine 2 or the brakes 7l, 7r, 9l, 9r in the situation where the vehicle center $C_{VC}$ of the vehicle 1 becomes so close to the allowed right-end point $E_{GR}$ or the allowed left-end point While the engine 2 is used as the power (drive) source in the above-described embodiment, the present invention is not limited to this. For example, an electric motor may be used as the power (drive) source.

What is claimed is:

1. A vehicle control device for applying a steering force to a steering wheel of a vehicle according to a vehicle traveling condition, comprising:
    a steering-force generator to generate the steering force applied to the steering wheel;
    a lane detector to detect a lane on which the vehicle travels;
    a vehicle-speed detector to detect a vehicle speed; and
    a controller to output a command signal to the steering-force generator based on detection results of the lane detector and the vehicle-speed detector,
    wherein said controller is configured to functionally comprise a first steering-force application control part for applying a first steering force to the steering wheel by means of said steering-force generator and a second steering-force application control part for applying a second steering force to the steering wheel by means of said steering-force generator,
    said first steering force is determined by a first steering characteristic which is operative to make the vehicle travel at a center of the lane,
    said second steering force is determined by a second steering characteristic, which is different from the first steering characteristic, which is operative to prevent the vehicle from deviating from the lane,
    said first steering characteristic is set such that a magnitude of said first steering force determined by the first steering characteristic changes according to the vehicle speed detected by said vehicle-speed detector in such a manner that the higher the vehicle speed is, the smaller the magnitude of the first steering force is, and
    said first steering characteristic is set such that an application start point of said first steering force determined by the first steering characteristic changes according to the vehicle speed detected by said vehicle-speed detector in a case where the vehicle speed is a specified speed or higher in such a manner that the higher the vehicle speed is, the greater an offset degree of said application start point which is offset, in a width direction of the lane, from the center of the lane is.

2. The vehicle control device of claim 1, wherein said second steering characteristic is set such that an application start point of said second steering force determined by the second steering characteristic is located at a specified position which is inwardly spaced apart, in a width direction of the lane, from an outer end of the lane by a specified distance, and said controller is configured such that said second steering force determined by the second steering characteristic is applied to the steering wheel but said first steering force determined by the first steering characteristic is not applied to the steering wheel under a specified condition where the application start point of the second steering force is positioned on an inward side, in the width direction of the lane, of the application start point of the first steering force.

3. The vehicle control device of claim 2, wherein said first steering characteristic is set such that an application start point of said first steering force determined by the first steering characteristic is located at the center of the lane in a case where the vehicle speed detected by said vehicle-speed detector is lower than a specified speed, and the first steering characteristic is set such that the magnitude of the first steering force determined by the first steering characteristic at said application start point of the first steering force in the case where the vehicle speed is lower than the specified speed changes according to the vehicle speed detected by the vehicle-speed detector in such a manner that the higher the vehicle speed is, the smaller the magnitude of the first steering force is.

4. The vehicle control device of claim 2, wherein in a case where said first steering characteristic and said second steering characteristic are shown by a characteristic diagram having two-dimensional coordinates with a horizontal axis as a position in a width direction of the lane and with a vertical axis as the magnitude of the steering force applied, the first steering characteristic includes a first steering-force increase part where said magnitude of the steering force gradually increases as said position changes from an inward side to an outward side in a width direction of the lane and the second steering characteristic includes a second steering-force increase part where said magnitude of the steering force gradually increases as said position changes from an inward side to an outward side in the width direction of the lane, and
    in a case where the vehicle speed detected by said vehicle-speed detector is within a specified speed range and a width of the lane is within a specified width range, a characteristic exchange point where the first steering characteristic and the second steering characteristic are exchanged is set, wherein said characteristic exchange point is positioned both in an area of said first steering-force increase part of the first steering characteristic and in an area of said second steering-force increase part of the second steering characteristic.

5. The vehicle control device of claim 1, wherein said first steering characteristic is set such that an application start point of said first steering force determined by the first steering characteristic is located at the center of the lane in a case where the vehicle speed detected by said vehicle-speed detector is lower than a specified speed, and the first steering characteristic is set such that the magnitude of the first steering force determined by the first steering characteristic at said application start point of the first steering force in the case where the vehicle speed is lower than the specified speed changes according to the vehicle speed detected by the vehicle-speed detector in such a manner that the higher the vehicle speed is, the smaller the magnitude of the first steering force is.

6. The vehicle control device of claim 5, wherein in a case where said first steering characteristic and said second steering characteristic are shown by a characteristic diagram having two-dimensional coordinates with a horizontal axis as a position in a width direction of the lane and with a vertical axis as the magnitude of the steering force applied, the first steering characteristic includes a first steering-force increase part where said magnitude of the steering force gradually increases as said position changes from an inward side to an outward side in a width direction of the lane and the second steering characteristic includes a second steering-force increase part where said magnitude of the steering force gradually increases as said position changes from an inward side to an outward side in the width direction of the lane, and in a case where the vehicle speed detected by said vehicle-speed detector is within a specified speed range and a width of the lane is within a specified width range, a characteristic exchange point where the first steering characteristic and the second steering characteristic are exchanged is set, wherein said characteristic exchange point is positioned both in an area of said first steering-force increase part of the first steering characteristic and in an area of said second steering-force increase part of the second steering characteristic.

7. The vehicle control device of claim 6, wherein said second steering force is larger than said first steering force.

8. The vehicle control device of claim 7, wherein in a case where said first steering characteristic is shown by a characteristic diagram having two-dimensional coordinates with a horizontal axis a position in a width direction of the lane and with a vertical axis as the magnitude of the steering force applied, the first steering characteristic includes a first-steering-force maintenance part where the magnitude of the steering force is maintained over a specified position range which covers from the center of the lane to a specified outward position in the width direction of the lane in a case where the vehicle speed detected by said vehicle-speed detector is lower than a specified speed.

9. The vehicle control device of claim 1, wherein in a case where said first steering characteristic and said second steering characteristic are shown by a characteristic diagram having two-dimensional coordinates with a horizontal axis as a position in a width direction of the lane and with a vertical axis as the magnitude of the steering force applied, the first steering characteristic includes a first steering-force increase part where said magnitude of the steering force gradually increases as said position changes from an inward side to an outward side in a width direction of the lane and the second steering characteristic includes a second steering-force increase part where said magnitude of the steering force gradually increases as said position changes from an inward side to an outward side in the width direction of the lane, and in a case where the vehicle speed detected by said vehicle-speed detector is within a specified speed range and a width of the lane is within a specified width range, a characteristic exchange point where the first steering characteristic and the second steering characteristic are exchanged is set, wherein said characteristic exchange point is positioned both in an area of said first steering-force increase part of the first steering characteristic and in an area of said second steering-force increase part of the second steering characteristic.

10. A vehicle control method for applying a steering force to a steering wheel of a vehicle according to a vehicle traveling condition, comprising the steps of:

detecting a lane on which the vehicle travels;

detecting a vehicle speed; and applying the steering force to the steering wheel based on detection results of the lane detection step and the vehicle-speed detection step, wherein said steering-force application step comprises a first steering-force application sub step of applying a first steering force to the steering wheel and a second steering-force application sub step of applying a second steering force to the steering wheel, said first steering force is determined by a first steering characteristic which is operative to make the vehicle travel at a center of the lane, said second steering force is determined by a second steering characteristic, which is different from the first steering characteristic, which is operative to prevent the vehicle from deviating from the lane, said first steering characteristic is set such that a magnitude of said first steering force determined by the first steering characteristic changes according to the vehicle speed detected by said vehicle-speed detector in such a manner that the higher the vehicle speed is, the smaller the magnitude of the first steering force is, and said first steering characteristic is set such that an application start point of said first steering force determined by the first steering characteristic changes according to the vehicle speed detected by said vehicle-speed detector in a case where the vehicle speed is a specified speed or higher in such a manner that the higher the vehicle speed is, the greater an offset degree of said application start point which is offset, in a width direction of the lane, from the center of the lane is.

11. The vehicle control method of claim 10, wherein said second steering characteristic is set such that an application start point of said second steering force determined by the second steering characteristic is located at a specified position which is spaced apart, in the width direction of the lane, from an outer end of the lane by a specified distance, and said first steering-force application sub step and said second steering-force application sub step are executed in such a manner that said second steering force is applied to the steering wheel with execution of the second steering-force application sub step but said first steering force is not applied to the steering wheel without execution of the first steering-force application sub step under a specified condition where the application start point of the second steering force is positioned on an inward side, in the width direction of the lane, of the application start point of the first steering force.

12. The vehicle control method of claim 11, wherein said second steering force is larger than said first steering force.

13. The vehicle control method of claim 10, wherein said second steering force is larger than said first steering force.

* * * * *